United States Patent [19]

Katoh et al.

[11] Patent Number: 5,197,116
[45] Date of Patent: Mar. 23, 1993

[54] METHOD OF RESOLUTION FOR RULE CONFLICT IN A KNOWLEDGE BASED SYSTEM

[75] Inventors: Naoki Katoh; Masato Mogaki, both of Hachioji, Japan

[73] Assignee: Hitachi, Ltd., Tokyo, Japan

[21] Appl. No.: 548,075

[22] Filed: Jul. 5, 1990

[30] Foreign Application Priority Data

Jul. 10, 1989 [JP] Japan ................................. 1-175467

[51] Int. Cl.⁵ .............................................. G06F 15/18
[52] U.S. Cl. ..................................... 395/51; 395/919; 395/921
[58] Field of Search ........................... 364/513; 395/51

[56] References Cited

U.S. PATENT DOCUMENTS

| | | | |
|---|---|---|---|
| 4,860,213 | 8/1989 | Bonissone | 364/513 |
| 4,890,240 | 12/1989 | Loeb et al. | 364/513 |
| 4,922,432 | 5/1990 | Kobayashi et al. | 364/490 |
| 4,959,799 | 9/1990 | Yoshiura et al. | 364/513 |
| 4,965,882 | 10/1990 | Barabash et al. | 364/513 |
| 5,014,327 | 5/1991 | Potter et al. | 382/14 |
| 5,016,204 | 5/1991 | Simoudis et al. | 364/578 |

OTHER PUBLICATIONS

Brownston et al., Programming Expert Systems in OPS5, Addison-Wesley Pub., 1985, pp. 5-9, 228, 229,284, 285, 366, 367.
Charniak et al., Artificial Intelligence Programming 2 ed, Lawrence Erlbaum Assoc., 1987, pp. 248-275, 472.
Tanimoto, S. L., The Elements of Artificial Intelligence, Computer Sci. Press, 1987, pp. 53-83, 139-164.
Barr et al., The Handbook of Artificial Intelligence, vol. I, William Kaufmann, Inc., 1981, pp. 20-31, 58-63, 196-199.
Parsaye et al., Expert Systems for Experts, John Wiley & Sons, 1988, pp. 273-275.
Langley, P., "Exploring the Space of Cognitive Architectures", Behavior Research Methods of Instrumentation; 1983, pp. 289-299.

Primary Examiner—Michael R. Fleming
Assistant Examiner—Robert W. Downs
Attorney, Agent, or Firm—Fay, Sharpe, Beall, Fagan, Minnich & McKee

[57] ABSTRACT

According to the present invention, in a knowledge based system having rules each constructed of "IF condition clause, THEN action clause", a working memory for storing a data group describing an inference object to which a rule is applied, and an inference engine, in selecting one instantiation from a conflict set, a rule for each instantiation is executed in accordance with the action clause of the rule, the execution results are evaluated by using an evaluation knowledge, and the evaluation results are compared to select the instantiation having a higher evaluation value. The data changed by the rule execution process for an instantiation aborted after the evaluation is recovered to the original state. The invention is applicable to the placement method of elements and interconnections within a semiconductor integrated circuit.

7 Claims, 11 Drawing Sheets

| CLASS | RECTANGULAR AREA |
|---|---|
| UPPER CLASS | : NONE |
| NAME | : AREA A |
| xmin | : 0 |
| xmax | : 10 |
| ymin | : 0 |
| ymax | : 20 |

301 — CLASS
302 — UPPER CLASS, NAME, xmin, xmax, ymin, ymax
303 — RECTANGULAR AREA, NONE, AREA A, 0, 10, 0, 20

| CLASS | INTERCONNECTION |
|---|---|
| UPPER CLASS | : RECTANGULAR AREA |
| NAME | : w121 |
| s-point | : (10, 15) |
| e-point | : (25, 15) |
| net | : net 03 |
| layer | : AL1 |
| width | : 12 |

| CLASS | ELEMENT |
|---|---|
| UPPER CLASS | : RECTANGULAR AREA |
| NAME | : r526 |
| x-point | : 25 |
| y-point | : 14 |
| type | : BR REGISTER |
| terminal | : (526-a, 526-b) |

301 — CLASS
302 — UPPER CLASS, NAME, x-point, y-point, type, terminal

(a) AREA RATIO 1.0 (70 x 40)

(b) AREA RATIO 0.71 (50x40)   (c) AREA RATIO 0.89 (50x50)

| RULE BASE |
|---|
| RULE 410 : IF WASTEFUL AREA, THEN ROTATE ELEMENT BY 90 DEGREES |
| RULE 420 : IF WASTEFUL AREA, THEN POSITION ELEMENT AT WASTEFUL AREA |
| RULE 430 : IF PARALLEL ROUTING INHIBITED PAIR, THEN DETOUR ON INTER-CONNECTION |

METHOD OF RESOLUTION FOR RULE CONFLICT IN A KNOWLEDGE BASED SYSTEM

BACKGROUND OF THE INVENTION

The present invention relates to a knowledge based system configured by adopting artificial intelligence, and more particularly to a knowledge based system capable of configuring a rule base without considering conflict resolution strategy.

Figure 8:
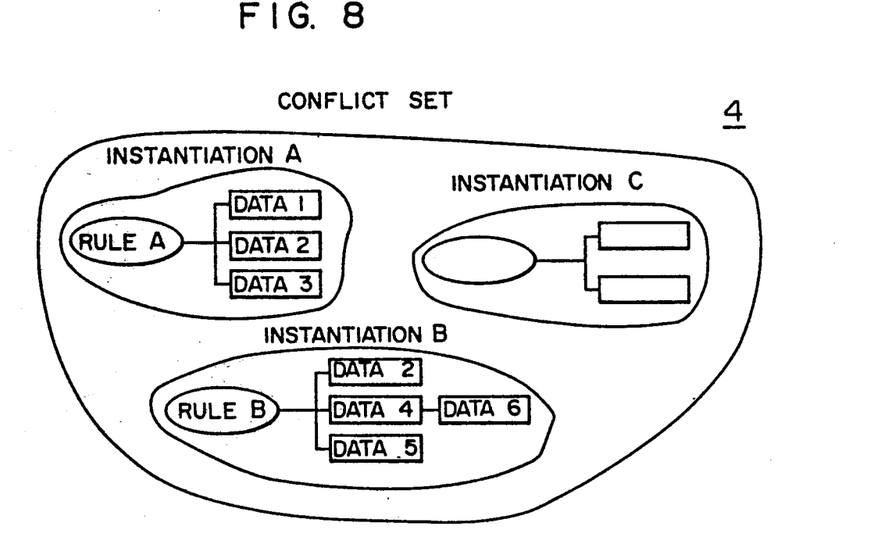
FIG. 8 is a diagram showing the relationship between instantiations and a conflict set.

Conflict as called in a knowledge based system means a state that where there are a plurality of rules executable whose condition clauses match data to be inferred. A set of an executable rule and a plurality of data matching the rule is called an instantiation. A group of a plurality of instantiations is called a conflict set. The relationship between instantiations and a conflict set is illustrated in FIG. 8. Selecting one of instantiations from a conflict set is called conflict resolution. Several conflict resolution strategies are shown in the document by P. H. Winston: Artificial Intelligence (2nd Edition, p. 170 to p. 171, Adison-Wesley Publishing Company, 1984).

Examples of conflict resolution strategies are shown below:

(1) Rule Priority Order: follow a priority order previously assigned to each rule.

(2) First Match: search rules in the order stored in a rule base and select the first found rule which matches data.

(3) Recent Executed Rule: consider the most recently executed rule to have the highest priority.

(4) Condition Clause Complexity: give the highest priority to the rule having the most complicated condition clause.

There is also known a strategy using a combination of the above-described strategies. A general expert system configuration language OPS5 adopts a complicated strategy which uses a combination of a number indicative of the up-to-dateness of data within an instantiation and an index indicative of the complexity of the rule condition clause.

SUMMARY OF THE INVENTION

In a conventional knowledge based system, conflict resolution has been made by using a predetermined strategy. It has not been allowed therefore to select an optimum strategy depending upon the state of an inference object expressed by data. In addition, it has been necessary to design a rule base while considering the conflict resolution strategy to be used, in order to reach a desired goal.

Figure 7:
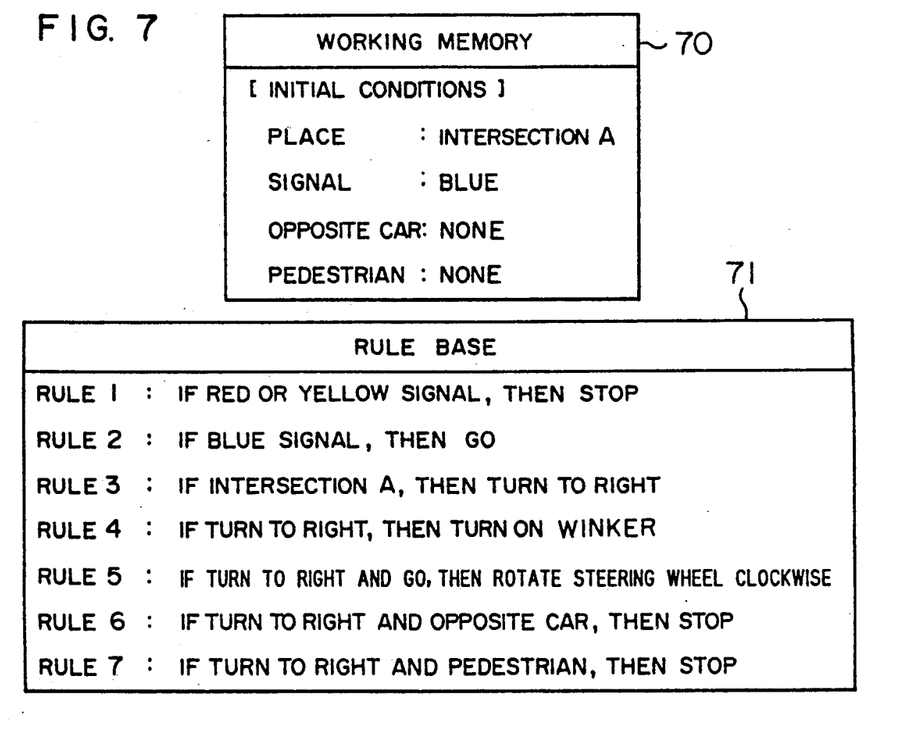
FIG. 7 shows examples of a working memory and rule base of an expert system used for explaining the problems associated with a conventional technique.

Conflict resolution following a predetermined strategy will be described taking, as an example, a knowledge for driving a car. FIG. 7 shows a working memory 70 and rule base 71 of a knowledge based system for driving a car. In the example shown in FIG. 7, it is assumed that as the conflict resolution strategy, the First Match is used according to which rule is selected in the order stored in a rule base, and that rules are stored sequentially in the order from small number. At the first inference cycle, rules 2 and 3 match the initial conditions stored in the working memory 70. Rule 2 having a smaller store order number is selected and it is judged as "Go". At the second inference cycle, rule 3 judges as "Turn to Right". At the third inference cycle, rules 4 and 5 match. Rule 4 having a smaller store order number is first selected, and there is executed "Turn on Winker", followed by "Rotate Steering Wheel Clockwise". In the above manner, the operation of turning to the right at an intersection is performed through inference. Next, the description will be given below for the case that a data "Opposite Car Present" is in the working memory. At the first and second inference cycles, rules 2 and 3 are executed in this order in the similar manner as discussed above. At the third inference cycle, selected are rules 4, 5 and 6 which include "Turn to Right" and do not include "Pedestrian". Rule 4 is first executed. At the next cycle, rules 5 and 6 match. In order to avoid the collision with an opposite car, it is necessary to execute rule 6 and "Stop". However, with this strategy, rule 5 having a smaller store order number is selected, resulting in an accident. To avoid this problem, it is necessary to change the store order between rule 5 and rules 6 and 7 which include "Opposite Car" and "Pedestrian". As an alternative case, it is assumed in the example shown in FIG. 7 that there is adopted a conflict resolution strategy which gives the highest priority to the rule having the most complicated condition clause. In this case, at the third inference cycle, rules 4 and 5 match. Rule 5 having the more complicated condition clause than rule 4 is given a priority and selected so that the car starts turning to the right without executing "Turn on Winker". It becomes therefore necessary to change the condition clause of rule 5 to "Turn to Right & Go & Turn on Winker", to apply only to rule 4 at the third inference cycle, and to fix the execution order of rules 4 and 5. It is accordingly necessary to configure a rule base while considering the relationship between rules.

As described above, in a conventional conflict resolution strategy of a knowledge based system, the conflict resolution strategy, rule contents, and rule base are tightly related to each other. Accordingly, in forming rules and configuring a rule base, there arises an issue that substantial consideration should be made as to what conflict resolution strategy be used.

A merit of a knowledge based system resides generally in that data, rules and an inference engine are decidedly separated, forming rules and configuring a rule base are allowed without considering the processing flow, and the system can be extended easily by increasing the number of rules. However, with a conventional conflict resolution strategy, such merit is limited so that the merit specific to the knowledge based system cannot be used fully. Further, a large scaled rule base is very difficult to be configured while considering the relationship between rules, resulting in large engineering labors required for realizing a rule base having no contradiction.

In order to solve the above-stated problems, the present invention provides a knowledge based system capable of improving the inference efficiency of reaching a desired goal, and readily forming rules and configuring a rule base, by selecting an optimum instantiation from a conflict set of a plurality of instantiations, in accordance with the context of inference.

According to the present invention, in a knowledge based system having rules each constructed of "IF condition clause, THEN action clause", a working memory for storing a data describing an inference object to which a rule is applied, and an inference engine, in selecting one instantiation from a conflict set, rule for each instantiation is executed in accordance with the action clause of the rule, the execution results are evaluated by using an evaluation knowledge, and the evaluation results are compared to select the instantiation having a higher evaluation value. The data changed by the rule execution process for an instantiation aborted after the evaluation is recovered to the original state.

According to the present invention, in selecting one instantiation from a conflict set, a rule for each instantiation is executed in accordance with the action clause of the rule, the execution results are evaluated by using an evaluation knowledge, and the instantiation is selected which has a higher evaluation value. Accordingly, it is possible to select an instantiation reflecting the execution results of a rule, resulting in an efficient inference ultimately reaching a desired goal.

Further, there is no need of designing rules and a rule base while considering a conflict resolution strategy or assuming possible inference processing as conventional, thereby resulting in a considerable reduction of labors required for the design of rules and a rule base.

DESCRIPTION OF THE PREFERRED EMBODIMENTS

Embodiments of this invention will be described with reference to the accompanying drawings.

Figure 1:
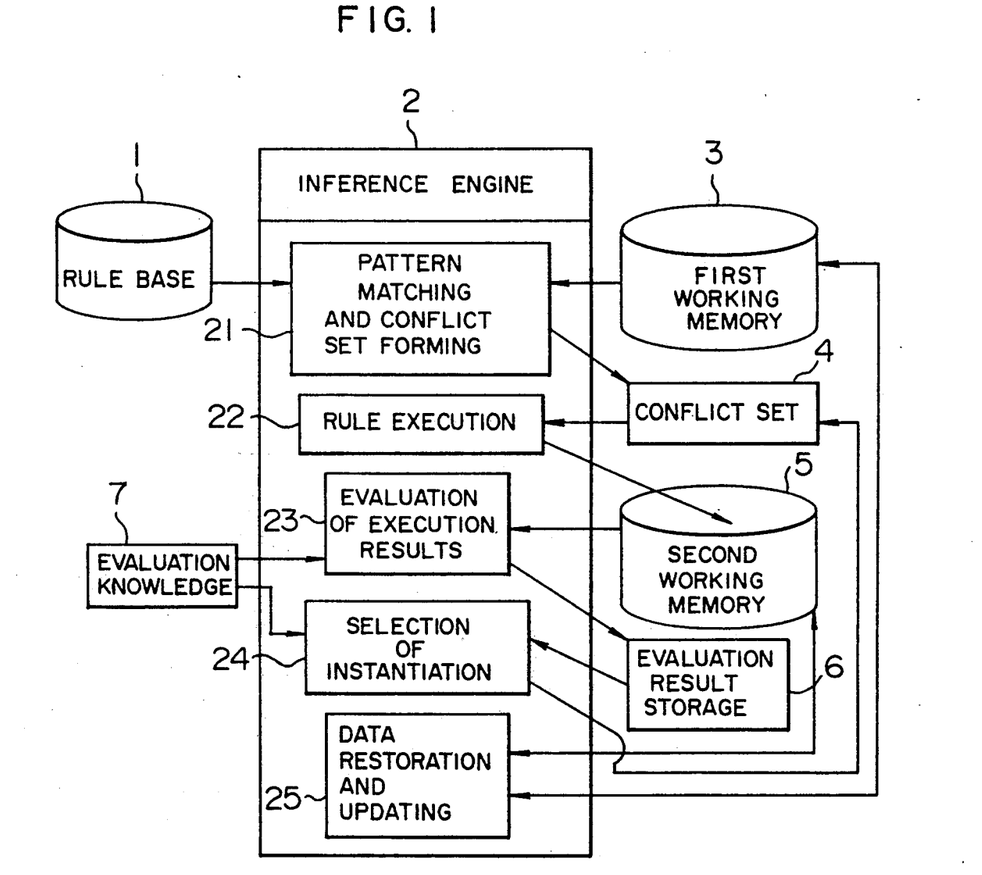
FIG. 1 is a block diagram showing the system embodying the present invention.

FIG. 1 is a block diagram showing an example of a system embodying the present invention. According to the embodiment of this invention, the system is constructed of a rule base 1 for storing rules in the format of "IF condition clause, THEN action clause", an inference engine 2 for performing inference processing, a first working memory 3 for storing a data group describing an inference object to which a rule is applied, and a conflict set having a number of instantiations each constructed of a combination of a rule to be applied and corresponding data. In addition, the system has a second working memory, an evaluation result storage 6, and an evaluation knowledge 7 sorting evaluation or objective functions and threshold values for evaluation values. The conflict set 4 holds a set of rules, data representative of inference objects applied to rules, and information indicating the relationship therebetween. The entities of rule and data are held in the rule base 1 and first working memory 3, respectively. At the start of inference, the second working memory 5 has the data whose contents are the same as the first working memory 3. The inference engine 2 is constructed of a pattern matching and conflict set forming process 21, rule execution process 22, instantiation selection process 24. In addition, the inference engine 2 includes an execution result evaluating process 23 for evaluating the execution results stored in the second working memory 5 in accordance with the evaluation knowledge base 7 and storing the evaluation results in the evaluation result storage 6, and a data restoration and updating process 25. Arrows shown in FIG. 1 have two types, ones directed to and the others extending from the inference engine 2. An arrow directed to the inference engine 2 means a reference to it for the inference processing. An arrow extended from the inference engine 2 means a generation and updating of data by the results of inference processing.

Figure 2:
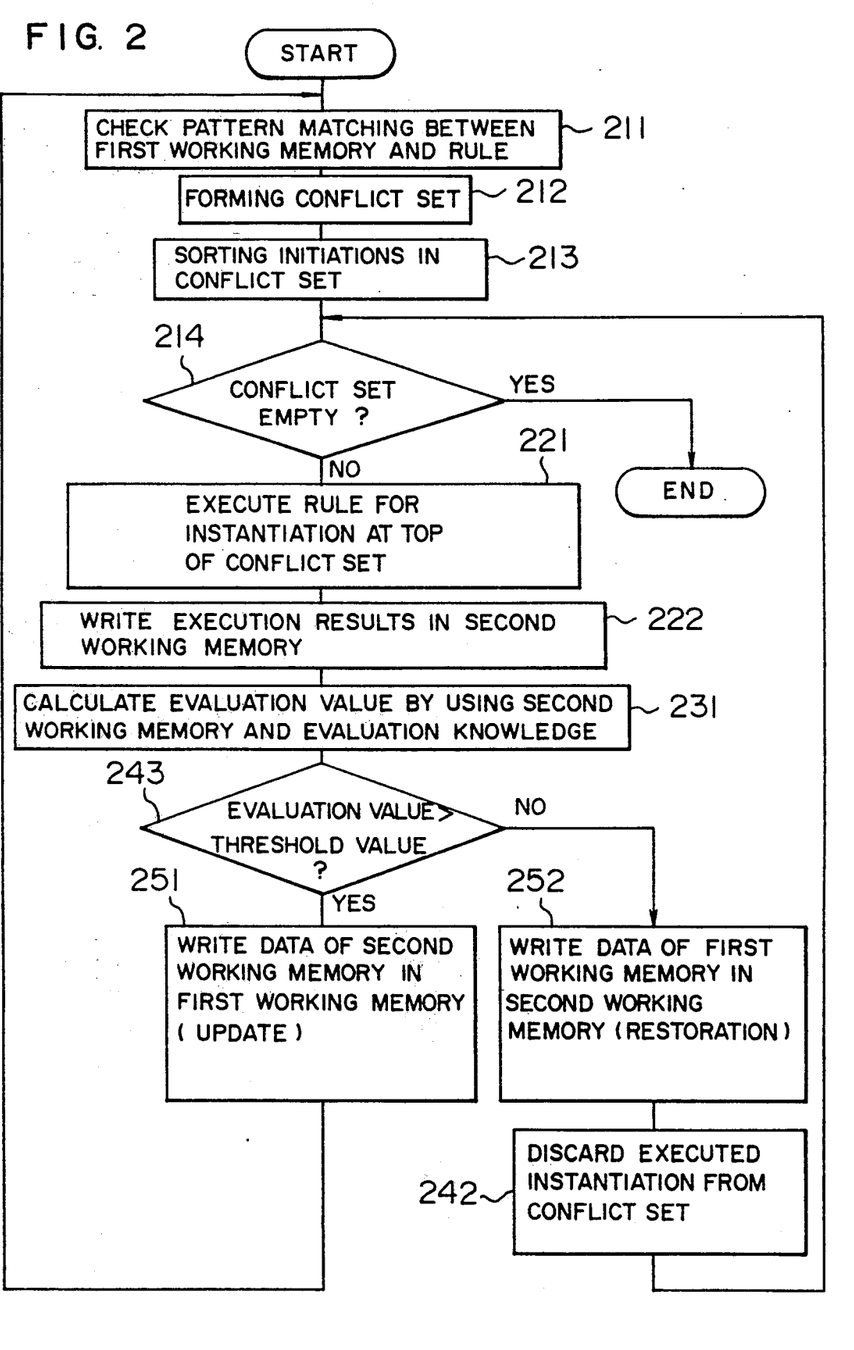
FIG. 2 is a flow chart showing the inference processing.

FIG. 2 is a flow chart showing the inference processing by the system shown in FIG. 1. The upper two digits of a number given to each step shown in FIG. 2 corresponds to the number of each process within the inference engine 2 shown in FIG. 1. For instance, steps 221 and 222 shown in FIG. 2 are related to the process 22 shown in FIG. 1. The details of inference processing will be given with reference to FIGS. 1 and 2. At the inference engine 2, the pattern matching and conflict set forming process 21 compares first the condition clauses of rules stored in the rule base 1 with the data stored in the first working memory 3 to thereby form instantiations each being constructed of a set of a rule to be applied and corresponding data (at step 211), and form a conflict set 4 having a number of instantiations (at step 212). The instantiations within the conflict set 4 are sorted in accordance with priority orders given to condition clauses of the rules (at step 213). Next, it is checked if there is any instantiation within a conflict set, and if the conflict set 4 is vacant, i.e., if there is no inference object, the inference cycle is terminated (at step 214). If there are instantiations within the conflict set 4, the rule execution process 22 executes a process conforming with the action clause of the rule for the instantiation stored at the top of the conflict set 4. Data reference, generation, change or deletion by this process is conducted with respect to the data stored in the second working memory 5 (at step 221). The execution result evaluating process 23 calculates the evaluation value of the execution results in the second working memory 5 by using the evaluation knowledge base 7, and stores the evaluation results in the evaluation result storage 6 (at step 231). The evaluation value is compared with a predetermined threshold value, and if the evaluation value is larger than the threshold value, this instantiation is adopted, whereas if not, it is aborted (at step 243). If the instantiation is adopted, the data in the second working memory 5 is written in the first memory to update the data (at step 251). Thereafter, the control returns to the initial step (at step 211) to repeat inference cycles. Specifically, if the rule is adopted, in order to proceed to the next inference cycle, the data in the first working memory is updated (at step 251). Then, returning back to the initial step, a new conflict set 4 is reformed, i.e., a new relationship between a rule and data is again formed. If the rule is aborted, the data restoration process 25 recovers the original data of the second working memory 5 by referring to the first working memory 3 (at step 252). The aborted instantiation is discarded from the conflict set 4 (at step 242) to return to step 214 and repeat the similar processes with respect to the next instantiation.

In the above manner, in the case of an aborted rule, the data changed during the rule execution is recovered to the original data for use with the next instantiation.

In the inference processing flow shown in FIG. 2, when the data in the first working memory 3 and a condition clause of a rule to be referenced become absent and so a conflict set cannot be formed, all processes are terminated (at step 214).

Next, the embodiment of this invention applied to an LSI layout design will be described. In an LSI layout design, it is desired to have a layout allowing a chip area as small as possible for the reduction of cost. In addition, in order to realize a desired circuit performance, there are some constraints which should be adhered, and some proposals such as "it is desired to design a layout in this way". To realize a layout sufficing these complicated conditions, first a layout designed by a certain method is subjected to area reduction by using this invention. In this case, while adhering to constraints and considering proposals, layout improvement is realized. In the following description, there is given layout improvement embodying the present invention.

Figure 3:
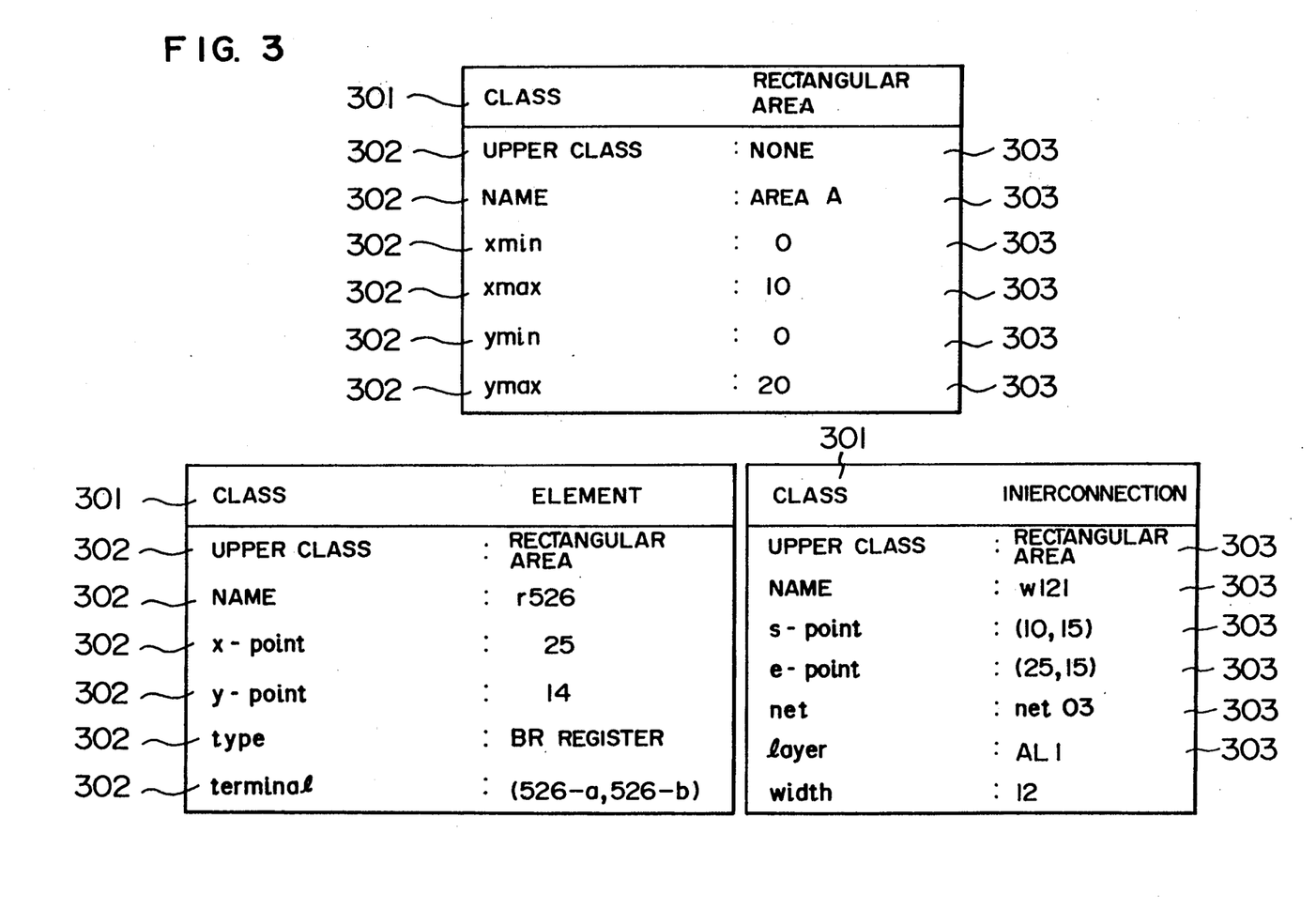
FIG. 3 is a diagram showing an example of the working memory according to an embodiment of this invention.

FIG. 3 shows an example of data in the first working memory 3. Knowledge is defined by a frame representation. Sets of data associated with a rectangular area, element, and interconnection as shown in FIG. 3 constitute respective frames. Data included therein are for layout objects such as transistors, resistors and other elements, for element terminals, for interconnections between terminals, for nets composed of a set of equipotential terminals, for through-holes for interconnection between different layers, and for the like. Each frame is assigned a class 301 such as interconnection, element, through-hole or the like. There is a hierarchical relationship between classes. A lower class succeeds to the property of an upper class. Namely, all properties of a lower class are not necessary to be described, but a part of properties can be extracted from an upper class. Each frame has a plurality of slot names 302 and corresponding slot values 303. Each slot name 302 describes the attribute of each data within the frame, and the corresponding slot value 303 describes its attribute value. A layout state is described by a combination of these frames. By describing the name of an upper hierarchic class in one of slots within each frame, it becomes possible to provide the hierarchic relationship between classes.

Figure 4:
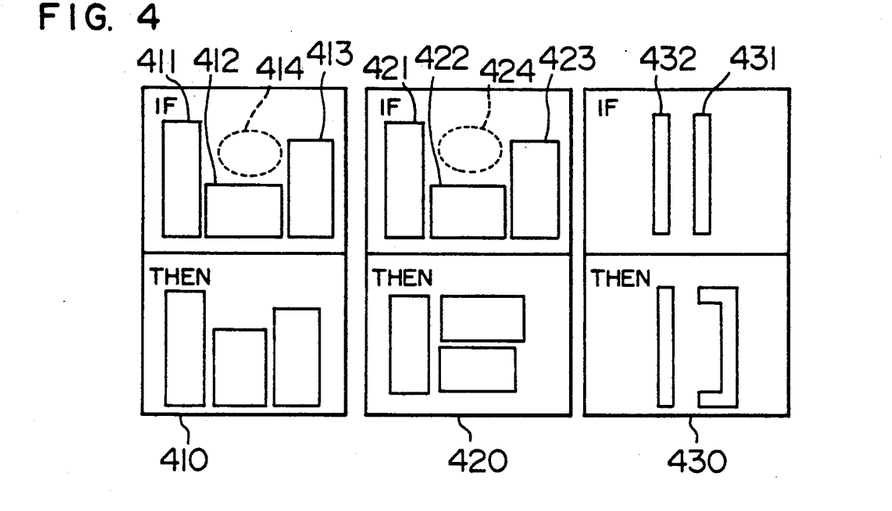
FIG. 4 is a diagram showing an example of the rule according to an embodiment of this invention.
Figure 9:
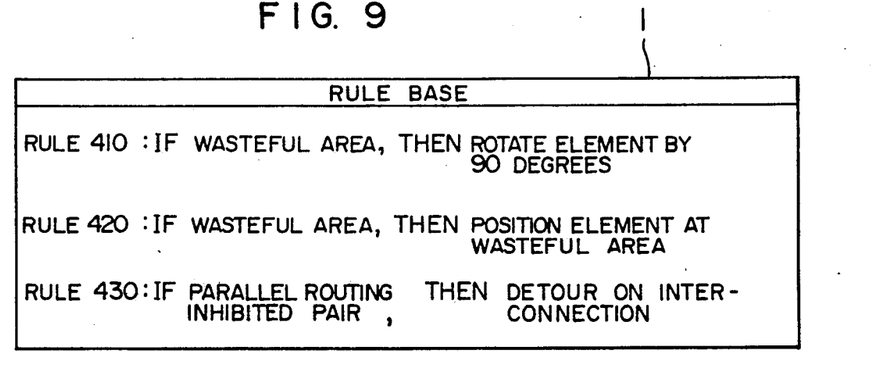
FIG. 9 is a diagram showing a rule base which stores rules applied to the embodiments shown in FIGS. 5 and 6 in the format of "IF condition clause, THEN action clause".

FIG. 4 shows three examples of rules for LSI design. In FIG. 4, for the purpose of convenience, the condition clause and action clause of each IF-THEN rule are expressed diagrammatically instead of programming language. Rules 410 and 420 are directed to placement improvement on reducing an area. With rule 410, the placement direction of element 412 between elements 411 and 413 is rotated by 90 degrees to thereby remove a wasteful area 414 between elements 411 and 413 and therefore reduce an area. Rule 420 is applied to the same combination of elements as rule 410. With rule 420, the placement direction of element 423 located at one end of element array is rotated by 90 degrees to place it at a wasteful area 424 to reduce an area. Rule 430 is one example of rules ensuring the circuit property. Some layout constraint inhibits an interconnection to be routed between other two interconnections in order to prevent interference between interconnections. Rule 430 has a description which causes one interconnection to detour so as to avoid a parallel routing interconnection pair which is inhibited and violating the layout constraint. Interconnections 431 and 432 shown in FIG. 4 are a parallel routing inhibited pair. In this case, interconnection 431 is detoured in a U-shape to obey the constraint. Area reduction rules and other rules for changing the layout at constraint violation are stored in the rule base 1 in the format of "IF condition clause, THEN action clause" such as shown in FIG. 9. Rules are stored in the rule base 1 in the order of highest priority, and a rule is selected by this priority order.

During the inference procedure, the layout state expressed by a set of data stored in the first working memory as shown in FIG. 3 is subjected to pattern matching with rules stored in the rule base such as shown in FIG. 4. The matched rules are sequentially selected and executed to improve the layout state and obtain a layout near a desired one.

The same data has generally a plurality of applicable rules, and the layout improvement result may differ depending upon which rule is selected from such applicable rules. Such example is illustrated in FIG. 5.

Figure 5:
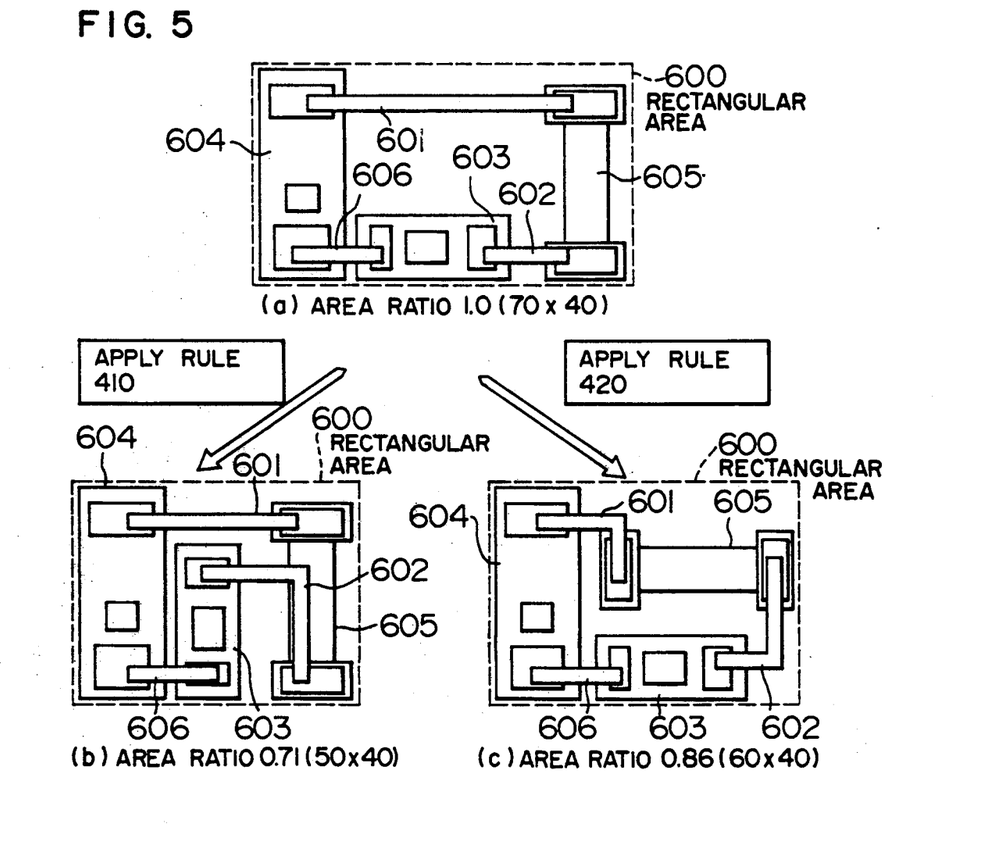
FIG. 5 shows an example of rule conflict in the embodiment of this invention.
Figure 10:
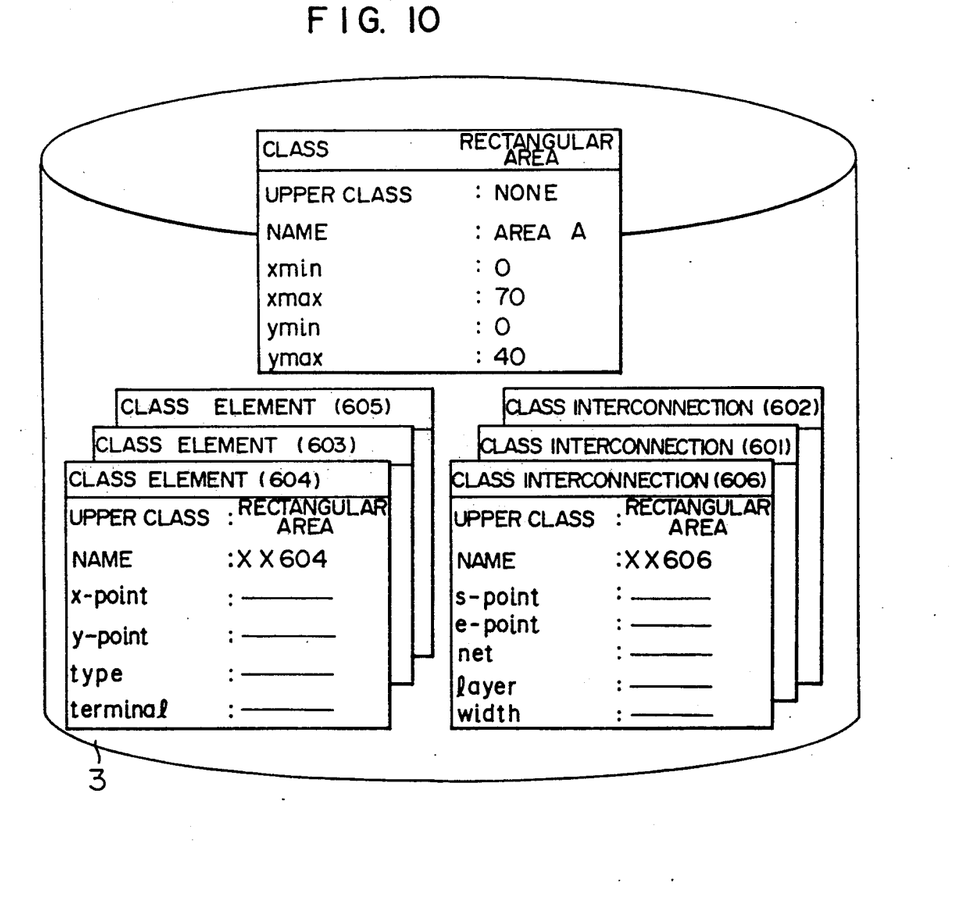
FIG. 10 shows the format of data having the layout used in the embodiments shown in FIGS. 5 and 6 and stored in the first working memory 3.

FIG. 5(a) shows a part of the layout of an LSI chip. This layout is described and stored in the first working memory 3 in the format shown in FIG. 10. The data representative of the correspondence between data and rules is stored in the conflict set 4. The layout shown in FIG. 5(a) is applicable to either rule 410 or rule 420 shown in FIG. 4. The results obtained by applying rules 410 and 420 are shown in FIGS. 5(b) and 5(c), respectively.

The numerals within parentheses in FIG. 5 indicate the horizontal and vertical lengths of a rectangular area 600 of each layout, at an optional scale factor. This representation is also applicable to FIG. 6.

Figure 6:
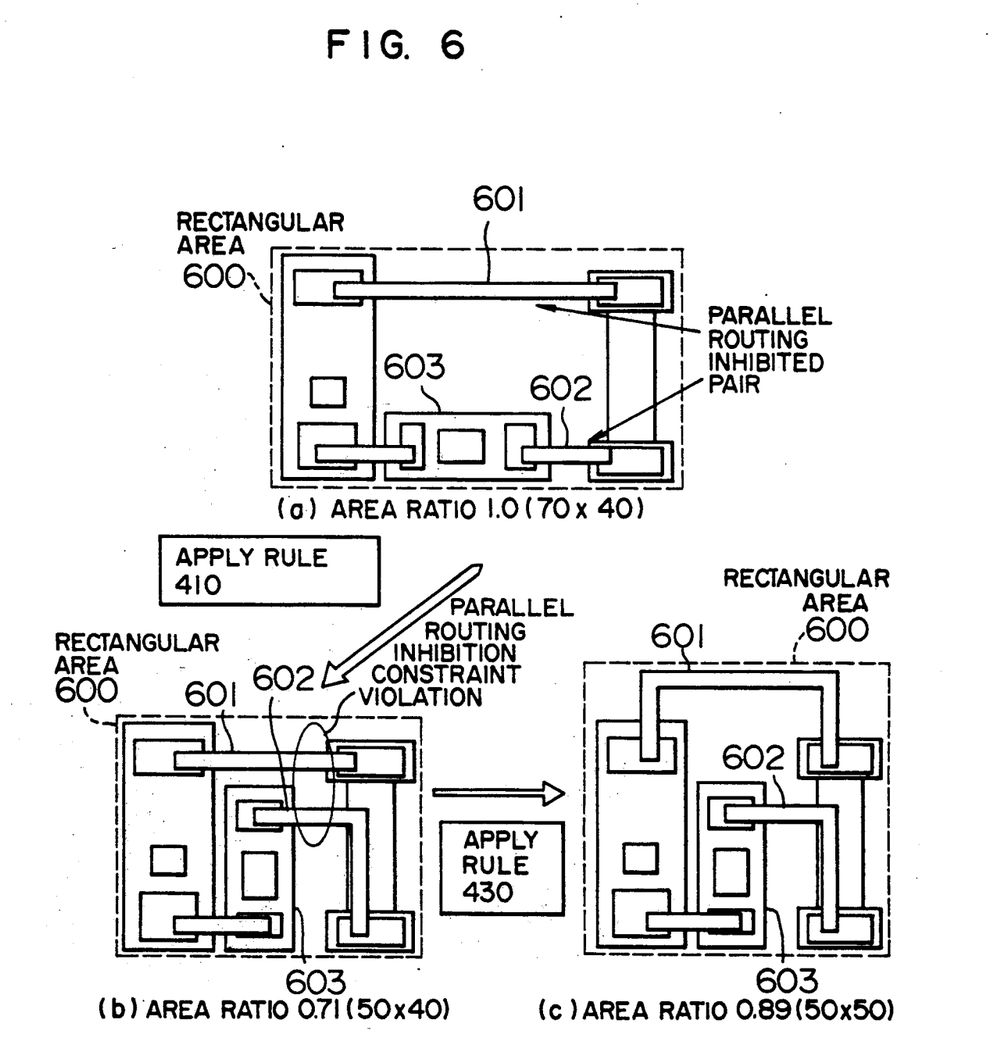
FIG. 6 shows another example of rule conflict in the embodiment of this invention, wherein a different rule from that shown in FIG. 1 is required to be selected.

As the evaluation value of the execution results, consider the inverse of a ratio of a layout area after applying a rule and a layout area before applying a rule. The smaller the area after applying a rule, the better the evaluation value. Assuming a value 1 as the layout area shown in FIG. 5(a), the area ratios for FIGS. 5(b) and 5(c) are improved to 0.71 and 0.86, respectively. The evaluation values which are an inverse of the area ratio becomes 1.41 and 1.16, respectively. In this case, if a threshold value 1.30 is used, rule 410 is selected. With a conventional conflict resolution strategy which selects a rule in accordance with a predetermined priority order, however, it is impossible to select such a rule that can provide a considerable area reduction effect. In other words, there arises a problem that if the priority of rule 420 is higher than that of rule 410, rule 420 having less area reduction effect is first selected. Apart from the above, consider the case where interconnections 601 and 602 shown in FIG. 6(a) are designated as a parallel routing inhibited pair because of the layout constraint. If rule 410 is applied to element 603 in FIG.

6(a) for the reduction of area, the constraint violation occurs as shown in FIG. 5(b), so that rule 430 for parallel routing inhibition is applied next. This results in an area ratio 0.89 as shown in FIG. 6(c). In this case, the area improvement ratio is reduced more than that when rule 420 is selected first as shown in FIG. 5(c). If rule 420 were selected first as in the case of FIG. 5(c), there is not produced a parallel routing inhibited pair.

According to the embodiment of this invention, rules 410 and 420 are sequentially selected and executed in accordance with the priority order, and the data changed, generated or deleted upon execution of a rule is stored in the second working memory 5. The data stored in the second working memory 5 is evaluated using the evaluation knowledge and evaluation means. In this case, an evaluation value is calculated on the basis of the area reduction ratio and a penalty by constraint violation. By comparing the evaluation value, rule 410 can be selected for the case of FIG. 5, and rule 420 can be selected for the case of FIG. 6 which poses a problem of constraint violation.

Figure 11:
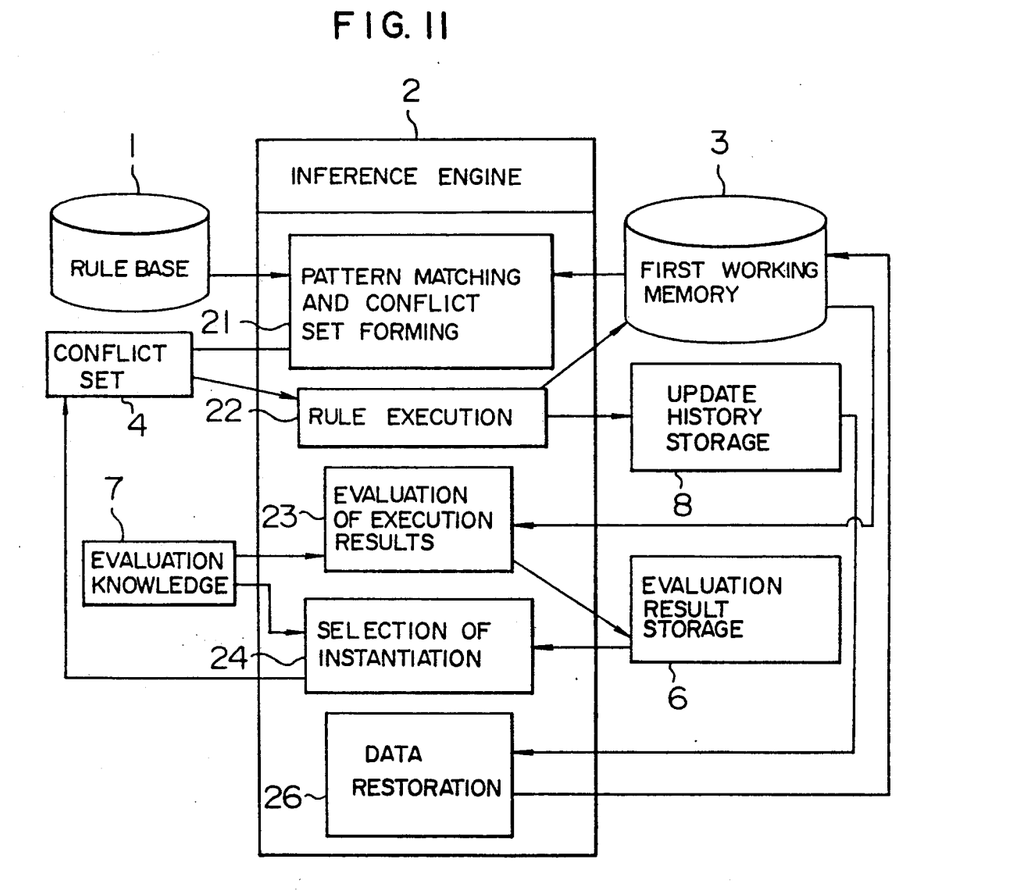
FIG. 11 is a block diagram of an embodiment system for recovering data by using a data update history.

In the embodiment described above, the second working memory 5 is used for storing the rule execution results. Another embodiment will be described wherein the rule execution results are stored in the first working memory 3, the data update history is stored in a separate storage, and the data is restored by using the data update history if the rule is aborted. FIG. 11 is a block diagram of the system according to this embodiment. In FIG. 11, an update history storage 8 is provided in place of the second working memory 5 shown in FIG. 1. After the rule execution process 22, the data is changed, generated or deleted in the first working memory 3, and this data processing procedure is stored in the update history storage 8 in a first-in first-out scheme. After the rule execution result evaluation process 23, the data for an aborted instantiation 2 is restored to the original state by the restoration process 26 by reversely tracking the data processing procedure stored in the update history storage 8.

Figure 12:
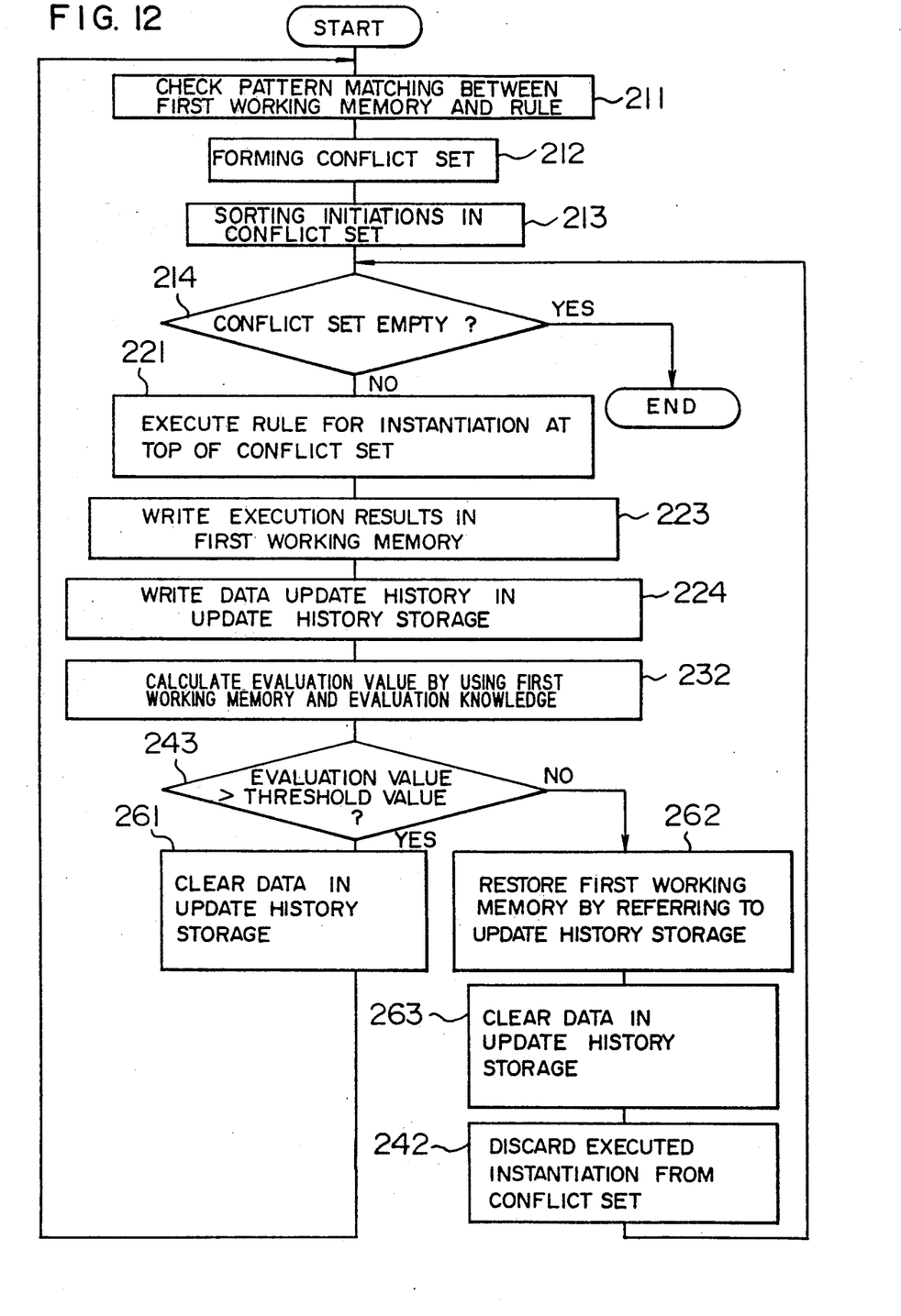
FIG. 12 is a flow chart showing the inference processing of the embodiment shown in FIG. 11.

FIG. 12 is a flow chart illustrating the inference processing by the embodiment shown in FIG. 11. The different steps from the flow chart shown in FIG. 2 will be described in detail. The rule execution process 22 executes data generation, change or deletion with respect to the first working memory 3 (at step 223). The data update history is written in the update history storage 8 in the first-in first-out scheme (at step 224). The execution result evaluation process 23 uses the evaluation knowledge 7 describing objective functions or evaluation functions to calculate the evaluation value of the execution results in the first working memory 3 and store the evaluation results in the evaluation result storage 6 (at step 232). The evaluation value is compared with a predetermined threshold value, and if the evaluation value is higher than the threshold value, the instantiation is adopted, whereas if not, it is aborted (at step 243). If the instantiation is adopted, the contents of the update history storage 8 are cleared, the storage 8 storing the procedure of data change, generation, or deletion with respect to the first working memory 3 (at step 261). Thereafter, the control returns to the initial step (at step 211) to repeat inference cycles. If the rule is aborted, the data stored originally in the first working memory 3 is recovered by reversely tracking the data processing procedure stored in the update history storage 8 by using the first-in first-out scheme (at step 262). Thereafter, the data in the update history storage 8 is cleared (at step 263), the aborted instantiation is discarded from the conflict set 4 (at step 242), and the control returns to step 214 to repeat the similar processing with respect to the next instantiation.

In the embodiments shown in FIGS. 11 and 12, each time one rule is executed, the evaluation value is calculated. Evaluation values may be calculated at a time after sequentially executing several rules and the evaluation values are evaluated. In such a case, the data update history obtained after sequentially executing several rules is orderly stored in the update history storage 8 so that the original data in the first working memory can be recovered.

Figure 13:
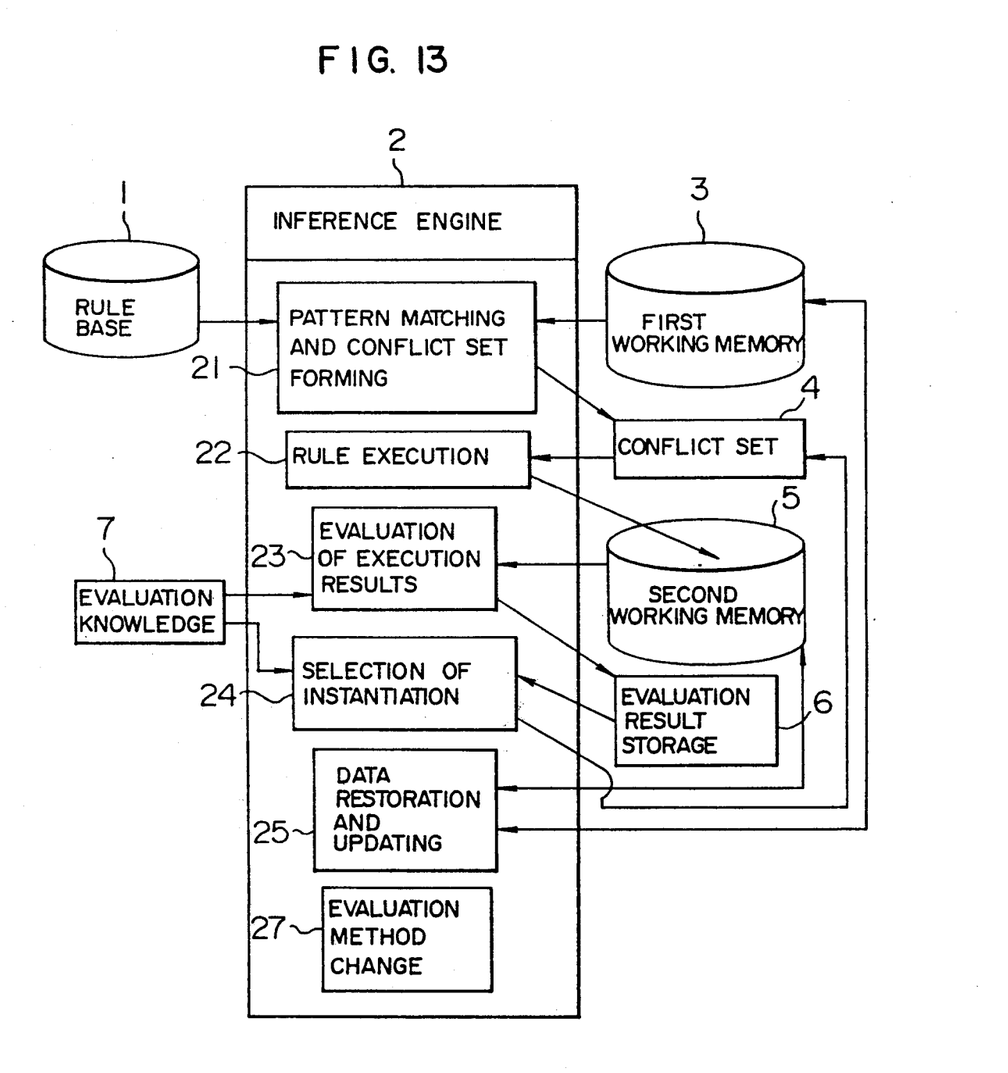
FIG. 13 is a block diagram showing an embodiment system capable of changing the evaluation method by changing the contents of evaluation knowledge.

In the above embodiments, the evaluation knowledge is assumed to be fixed as shown in FIG. 1. In the embodiment described below, the evaluation scheme can be changed by modifying the evaluation knowledge 7 by a user of the knowledge based system. FIG. 13 is a block diagram of the system of this embodiment wherein an evaluation method changing process 27 for modifying the evaluation knowledge 7 is added to the system shown in FIG. 1.

Figure 14:
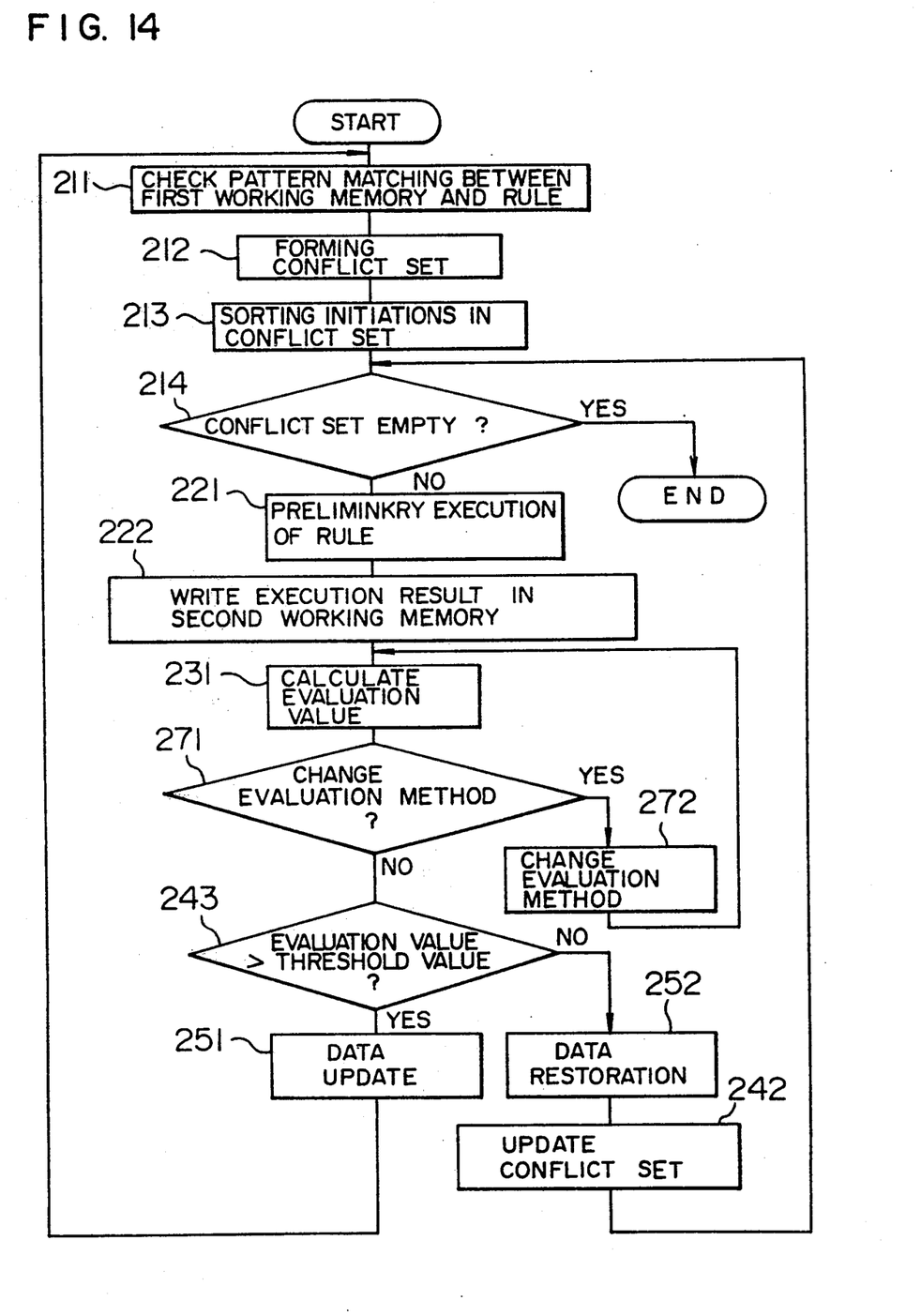
FIG. 14 is a flow chart showing the inference processing of the embodiment shown in FIG. 13.

FIG. 14 is a flow chart showing the inference processing of the embodiment shown in FIG. 13. The different steps from the flow chart shown in FIG. 2 will be described in detail. The execution result evaluation process 23 calculates the evaluation value of the execution results stored in the second working memory 5 (at step 231). The evaluation results are evaluated by the user of the knowledge based system of this invention to thereby determine if the evaluation method is changed or not (at step 271). If the evaluation method is to be changed, the evaluation method changing process 272 modifies the contents of the evaluation knowledge 7 upon actuation by the user. Thereafter, the evaluation value is calculated again (at step 231), and if an evaluation method is not necessary to be changed, the evaluation value is compared with the threshold value (at step 243). During the process at the loop of steps 231, 271 and 272, the data in the second working memory 5 storing the rule execution results is not changed, but only the data evaluation method is changed.

As already discussed, the data stored in the evaluation knowledge 7 may include the following item:
(1) objective functions giving evaluation values
(2) parameters for objective functions
(3) threshold values for evaluation values
(4) conditional formulas for selecting instantiation such as "(evaluation value A>threshold value a) AND (evaluation value B>threshold value b)".

The following issues may occur which require a change of the evaluation method (at step 272):
1) to change an evaluation item composed of an objective function and its threshold value, i.e., to make severe the contents of evaluation by adding an evaluation item, or conversely to make loose the contents of evaluation by deleting an evaluation item.
2) to change a parameter in an objective function, i.e., to apply an already defined objective function to another inference.
3) to change a threshold value for an evaluation value, i.e., to make loose a threshold value if there is no rule having the evaluation value not in excess of the threshold value after evaluation of execution results of several rules.

At step 271 shown in FIG. 14, a user of the knowledge based system of this invention determines if the evaluation method is changed or not and the contents of change. This may be included in the internal process within the inference engine 2. Specifically, the inference engine 2 checks the results of an evaluation value calculation (at step 231) or the progress of inference processing, and automatically starts up the evaluation method changing process 272 to thereby change the evaluation knowledge 7 in accordance with the evaluation results. In such a case, the decision criterion for a change of the evaluation method and the contents to be changed are included in the evaluation knowledge 7.

As appreciated from the foregoing description of the knowledge based system of this invention, it is possible to select a rule suitable for a particular inference from a plurality of applicable rules and execute it, by evaluating the results obtained upon execution of an applicable rule.

Accordingly, an efficient inference can be performed without being restricted by the rule priority order, eliminating a fault conclusion or an inability to reaching a desired goal.

Further, there is no need of doing difficult works such as "to decide the order of storing rules while considering the inference processing flow", or "to make rules while considering the relationship of other rules", which has been heretofore carried out in making rules and configuring a rule base with a conventional conflict resolution strategy. Accordingly, a number of steps in making rules and configuring a rule base can be reduced remarkably.

We claim:

1. A method of operating a computer to resolve a rule conflict in a knowledge based system using an inference engine, the method comprising the steps of:
    (a) inputting form a rule base, rules, each composed of a condition clause and an action clause which is executed if the condition clause is satisfied;
    (b) inputting form a first working memory a data group describing an inference object to which a rule is applied;
    (c) checking a pattern matching between the condition clause of said rule and the data in sad first working memory to form an instantiation composed of an applicable rule and data, and to form a conflict set composed of a plurality of instantiations;
    (d) executing a process of changing said data in accordance with the action clause of the applicable rule of each said instantiation through the sub-steps of,
        (d1) selecting one of said plurality of instantiations from said conflict set,
        (d2) executing the action clause of the applicable rule for said selected instantiation, wherein said rule is executed with respect to a second working memory having the same contents as said first working memory;
    (e) inputting an evaluation knowledge defining an evaluation method for evaluating the results of execution in step (d) of the applicable rule in accordance with the action clause, wherein the execution results are stored in said second working memory;
    (f) evaluating the execution results sorted in said second working memory by using said evaluation knowledge;
    (g) updating data stored in said second working memory according to the execution results and copying said updated data from said second working memory to said first working memory, if an evaluation value of the execution results in equal to or larger than a threshold value predetermined as one of said evaluation knowledge, and jumping to step (a); and,
    (h) recovering data stored in said second working memory by copying data stored in said first working memory in accordance with said updated data from said first working memory to said second working memory and deleting form said conflict set said instantiation executed by the step (d), if an evaluation value of the executing results is smaller than a threshold value predetermined as one of said evaluation knowledge, and jumping to step (d).

2. A method of operating a computer to resolve a rule conflict according to claim 1, wherein in step (d) for executing the applicable rule for one instantiation within said conflict set, said rule is executed in accordance with a predetermined priority order previously assigned to each said condition clause of each rule.

3. A method of operating a computer to resolve a rule conflict according to claim 1, wherein in step (d) for executing the applicable rule for one instantiation within said conflict set, said rule is executed in accordance with a predetermined priority order previously assigned to each said condition clause of each data.

4. A method of operating a computer to resolve a rule conflict according to claim 1, wherein in selecting one instantiation form said conflict set, an instantiation having said evaluation value higher than those of the plurality of other instantiations is selected.

5. A method of operating a computer to resolve a rule conflict according to claim 1, wherein in evaluating the execution results of said rule, a user of the knowledge based system changes the evaluation method by changing said evaluation knowledge so that changing said evaluation method and evaluating the execution results by said changed evaluation method can be repeatedly executed.

6. A method of operating a computer to resolve a rule conflict according to claim 1, wherein said evaluation method can be changed in accordance with the evaluation results of said execution results or the progress state of inference.

7. A method of operating a computer to resolve a rule conflict in a knowledge based system by using an inference engine, comprising the steps of:
    (a) inputting from a rule base, rules, each composed of a condition clause describing a placement method for element and interconnections of a semiconductor integrated circuit and describing a constraint limitation and an action clause describing the contents which are executed if the condition clause is satisfied;
    (b) inputting from a first working memory data representing the placement coordinates and attributes of said elements and interconnections to be applied to a rule;
    (c) checking a pattern matching between the condition clause of said rule and the data in said first working memory to form an instantiation composed of an applicable rule and data, and to form a conflict set composed of a plurality of instantiations;
    (d) executing a process of changing said data in accordance with the action clause of the applicable rule of each said instantiation through the sub-steps of, (d1) selecting on of said plurality of instantiation form said conflict set, (d2) executing the action clause of the applicable rule for said selected instantiation, wherein said rule is executed with respect to a second working memory having the same contents as said first working memory;

(e) inputting an evaluation knowledge defining an evaluation method for evaluating the results of execution in step (d) of a rule in accordance with the action clause, wherein the execution results are stored in said second working memory;

(f) evaluating the execution results sorted in said second working memory by using said evaluation knowledge;

(g) updating data sorted in said second working memory according to the execution results and copying said updated data form said second working memory to said first working memory, if an evaluation value of the execution results in equal to or larger than a threshold value predetermined as one of said evaluation knowledge, and jumping to step (a); and, (h) recovering data stored in said second working memory by copying data stored in said first working memory in accordance with said updated data from said first working memory to said second working memory and deleting form said conflict set said instantiation executed by step (d), if an evaluation value of the execution results is smaller than a threshold value predetermined as one of said evaluation knowledge, and jumping to step (d).

* * * * *

UNITED STATES PATENT AND TRADEMARK OFFICE
CERTIFICATE OF CORRECTION

PATENT NO. : 5,197,116
DATED : March 23, 1993
INVENTOR(S) : Naoki Katoh, et al.

It is certified that error appears in the above-identified patent and that said Letters Patent is hereby corrected as shown below:

Claim 1, column 9, line 34, delete "form" and substitute therefor --from--;
line 37, delete "form" and substitute therefor --from--;
line 41, delete "sad" and substitute therefor --said--;
column 10, line 10, delete "form" and substitute therefor --from--;
line 12, delete "executing" and substitute therefor --execution--.

Claim 4, column 10, line 29, delete "form" and substitute therefor --from--.

Claim 7, column 10, line 50, delete "element" and substitute therefor --elements--;
column 11, line 1, delete "on" and substitute therefor --one--;
line 2, delete "form" and substitute therefor --from--;
line 13, delete "sorted" and substitute therefor --stored--;
line 16, delete "sorted" and substitute therefor --stored--;
column 12, line 3, delete "in" and substitute therefor --is--;
line 11, delete "form" and substitute therefor --from--.

Signed and Sealed this

Thirtieth Day of November, 1993

Attest:

BRUCE LEHMAN

*Attesting Officer*          *Commissioner of Patents and Trademarks*